United States Patent
Park et al.

(10) Patent No.: US 7,662,870 B2
(45) Date of Patent: Feb. 16, 2010

(54) COMPOSITION FOR ARTIFICIAL STONE, AN ARTICLE INCLUDING THE SAME, AND A METHOD OF FORMING THE SAME

(75) Inventors: Eung Seo Park, Yeosu-si (KR); Sung Mook Choi, Yeosu-si (KR); Dong Hee Kim, Suncheon-si (KR); Jae Wook Juen, Seoul (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 196 days.

(21) Appl. No.: 11/998,412

(22) Filed: Nov. 30, 2007

(65) Prior Publication Data

US 2008/0153964 A1  Jun. 26, 2008

Related U.S. Application Data

(63) Continuation-in-part of application No. PCT/KR2005/002057, filed on Jun. 30, 2005.

(30) Foreign Application Priority Data

May 30, 2005  (KR) .................. 10-2005-0045469

(51) Int. Cl.
*C09D 5/29* (2006.01)
(52) U.S. Cl. ...................................... 523/171; 523/218
(58) Field of Classification Search ................. 523/171, 523/218
See application file for complete search history.

(56) References Cited

U.S. PATENT DOCUMENTS 6,316,548 B1  11/2001  Koyanagi et al.

FOREIGN PATENT DOCUMENTS

| EP | 0 976 786 A1 | 2/2000 |
|---|---|---|
| JP | 10-045815 | 2/1998 |
| JP | 11-071416 | 3/1999 |
| JP | 2000-327389 | 11/2000 |
| JP | 2001-139754 | 5/2001 |
| KR | 10-2004-0005044 | 1/2004 |

*Primary Examiner*—Edward J Cain
(74) *Attorney, Agent, or Firm*—Lee & Morse, P.C.

(57) ABSTRACT

A composition for artificial stone includes an acrylic resin, sponge particles in an amount of about 0.001 ppwa to about 50 ppwa, filler in an amount of about 100 ppwa to about 300 ppwa, and a polymerization initiator in an amount of about 0.1 to about 10 ppwa.

20 Claims, 3 Drawing Sheets

COMPOSITION FOR ARTIFICIAL STONE, AN ARTICLE INCLUDING THE SAME, AND A METHOD OF FORMING THE SAME

CROSS-REFERENCE TO RELATED APPLICATION

This application is a continuation of PCT Application No. PCT/KR2005/02057, entitled "Composition for Artificial Marble Having Natural Pattern," which was filed on Jun. 30, 2005, and is hereby incorporated by reference in its entirety.

BACKGROUND OF THE INVENTION

1. Field of the Invention

Embodiments of the present invention relate to a composition for artificial stone. More particularly, embodiments of the present invention relate to a composition for artificial stone including pulverized sponge and exhibiting three-dimensional stone-like patterns.

2. Description of the Related Art

In general, artificial stone compositions may be used as interior building materials to imitate natural stone, e.g., form kitchen counter tops, wash bowls, dressing tables, bathtubs, wall panels, and so forth, due to their stone-like appearance, high quality texture, and good weatherability. The conventional artificial stone compositions may be classified into acrylic compositions or unsaturated polyester compositions, and may include artificial stone chips in order to impart the stone-like appearance thereto.

However, use of artificial stone chips may impart a dull appearance to a resultant product, i.e., an article formed of the artificial stone composition. Further, use of artificial stone chips composition may increase an overall weight of the composition, thereby decreasing workability and increasing manufacturing costs thereof.

SUMMARY OF THE INVENTION

Embodiments of the present invention are therefore directed to a composition for artificial stone, an article including the same, and a method of forming the same, which substantially overcome one or more of the problems due to the limitations and disadvantages of the related art.

It is therefore a feature of an embodiment of the present invention to provide a composition for artificial stone with pulverized sponge and exhibiting three-dimensional stone-like patterns.

It is another feature of an embodiment of the present invention to provide an article including a composition for artificial stone with pulverized sponge and exhibiting three-dimensional stone-like patterns.

It is yet another feature of an embodiment of the present invention to provide a method of forming an article including a composition for artificial stone with pulverized sponge and exhibiting three-dimensional stone-like patterns.

At least one of the above and other features and advantages may be realized by providing a composition for artificial stone, including an acrylic resin, sponge particles in an amount of about 0.001 ppwa to about 50 ppwa, filler in an amount of about 100 ppwa to about 300 ppwa, and a polymerization initiator in an amount of about 0.1 to about 10 ppwa.

The acrylic resin may include a mixture of an acrylic monomer and a polyacrylate, the acrylic monomer being one or more of methacrylic acid, methyl methacrylate, ethyl methacrylate, isopropyl methacrylate, n-butyl methacrylate, and/or 2-ethylhexyl methacrylate. The acrylic resin may include acrylic monomer in an amount of about 65% or more by weight of a total weight of the acrylic resin. The sponge particles may include polyester particles and/or polyamide particles. The composition sponge particles may have a diameter of about 0.01 mm to about 30 mm. The sponge particles may include a dye and/or a pigment. The sponge particles may include an additive. The additive may be one or more of a lubricant, a plasticizer, a stabilizer, a reinforcing agent, and/or a flame retardant. Each sponge particle may include a porous web. The filler may include one or more of calcium carbonate, aluminum hydroxide, silica, alumina, barium sulfate, and/or magnesium hydroxide. The composition may further include stone chips having a diameter of about 0.1 mm to about 5 mm.

At least one of the above and other features and advantages may be further realized by providing an artificial stone article, including a solidified slurry composition having an acrylic resin, sponge particles in an amount of about 0.001 ppwa to about 50 ppwa, filler in an amount of about 100 ppwa to about 300 ppwa, and a polymerization initiator in an amount of about 0.1 to about 10 ppwa.

The sponge particles may include a porous web. The sponge particles may include a dye and/or a pigment in the porous web. The solidified slurry composition may include a dye and/or a pigment around the sponge particles. The solidified slurry composition may exhibits random three-dimensional patterns having different shades of a same color.

At least one of the above and other features and advantages may be further realized by providing a method of forming an artificial stone article, including mixing an acrylic resin, sponge particles in an amount of about 0.001 ppwa to about 50 ppwa, filler in an amount of about 100 ppwa to about 300 ppwa, and a polymerization initiator in an amount of about 0.1 to about 10 ppwa to form a slurry composition, and curing the slurry composition. Forming the slurry composition may include heating the acrylic resin after adding the sponge particles. Forming the slurry composition may include heating the acrylic resin and the sponge particles at a temperature of about 120° C. to about 150° C. A porous web in the sponge particles may spread out by an exothermic process.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1:
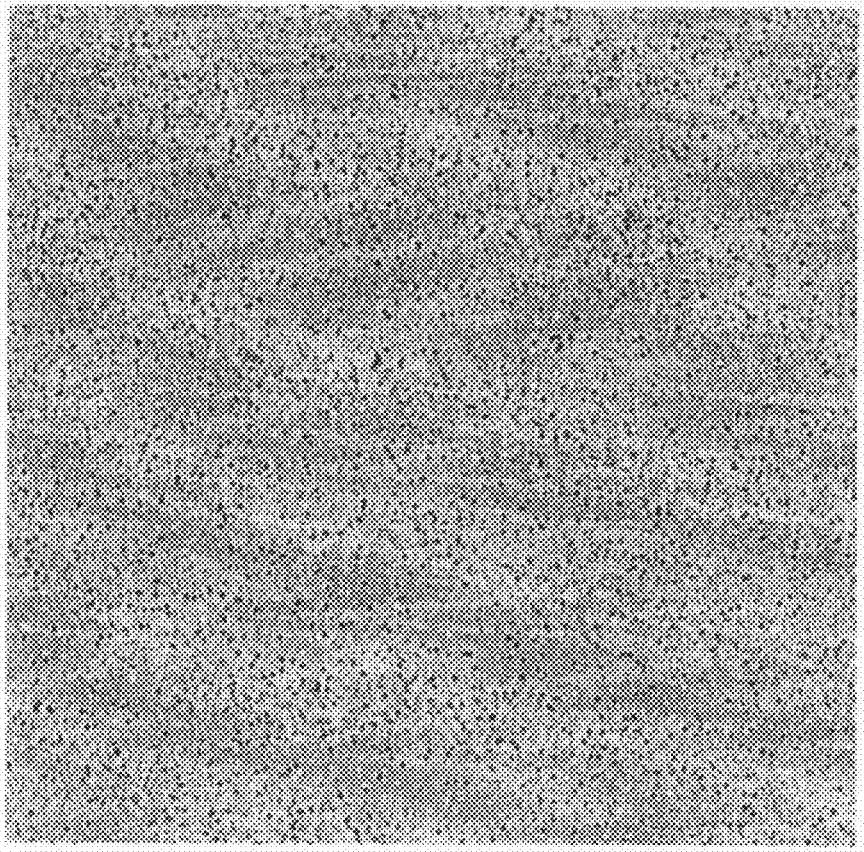
FIG. 1 illustrates a photograph of a surface pattern of a conventional artificial stone article including stone chips.

Korean Patent Application No. 10-2005-0045469, filed on May 30, 2005, in the Korean Intellectual Property Office, and entitled: "Composition for Artificial Marble Having Natural Pattern," is incorporated by reference herein in its entirety.

An exemplary embodiment of a composition for artificial stone according to the present invention may include an acrylic resin, sponge, filler, and a polymerization initiator. In particular, the composition may include about 100 parts by weight of an acrylic resin, about 0.001 to about 50 parts by weight of pulverized sponge, about 100 to about 300 parts by weight of inorganic filler, and about 0.1 to about 10 parts by weight of a polymerization initiator. In this respect, it should be noted that weights hereinafter may be indicated with respect to the weight of the acrylic resin, such that weights calculated as "parts by weight per 100 parts by weight of the acrylic resin" are indicated as "ppwa."

The acrylic resin may include a mixture of an acrylic monomer with a corresponding polyacrylate, e.g., a mixture of methyl methacrylate (MMA) with polymethylmethacrylate (PMMA). Examples of suitable acrylic monomers may include methacrylic acid, methyl methacrylate, ethyl methacrylate, isopropyl methacrylate, n-butyl methacrylate, 2-ethylhexyl methacrylate, and so forth. Examples of suitable polyacrylates may include PMMA, poly (ethyl methacrylate), poly (isopropyl methacrylate), poly (n-butyl methacrylate), poly (2-ethyl hexyl methacrylate), and so forth. The polyacrylate may be a polymer and/or a copolymer. The acrylic monomer may be present in the acrylic resin in an amount of about 65% or more by weight of a total weight of the acrylic resin. The polyacrylate may be present in the acrylic resin in an amount of about 35% or less by weight of a total weight of the acrylic resin.

The sponge of the composition for artificial stone may be, e.g., a porous material, in a pulverized form. In other words, the pulverized sponge may refer to small particles having a porous structure, i.e., each particle may have a plurality of open pores or channels of different sizes and structures to form a porous web. For example, the sponge may be a material used as a finishing material of a bottom and/or top of a three-dimensional miniature building or a material of a dishwashing scrubber. The sponge may be produced by, e.g., expansion-molding, of any suitable material, e.g., polyester or polyamide due to their stability with respect to the MMA resin. For example, the sponge may be commercially available from KUKJE Industrial Co., Ltd. In this respect, it is noted that the terms "pulverized sponge" and "sponge particles" may be used throughout the specification interchangeably.

A color of the sponge may be adjusted. That is, the sponge may be died with an inorganic pigment or dyestuff, so the porous web of each sponge particle may include pigment or dye forming uniquely shaped and colored three-dimensional patterns, e.g., natural marble-like textures, therein.

The pulverized sponge may be mixed with the acrylic resin and polymerization initiator at a temperature of about 120° C. to about 150° C., so the inorganic pigment and/or dyestuff may move through the porous web of each of the sponge particles. The inorganic pigment and/or dye may randomly spread within the porous web of each sponge particle, and/or may spread through the porous web of each sponge particle to leak out of the porous web, i.e., spread to an area external to the sponge particle. Subsequent curing of the artificial stone slurry may solidify the artificial stone slurry to form an article, thereby locking the inorganic pigment and/or dye within the porous web of the sponge particles and/or in the area external thereto.

The solidified artificial stone slurry, i.e., resultant artificial stone article, may have primary three-dimensional patterns corresponding to the colored porous webs of the sponge particles, and may have secondary patterns, i.e., three-dimensional patterns or dot patterns, external to the sponge particles. The secondary patterns external to the sponge particles may correspond to the inorganic pigment and/or dye leaking out of the sponge particles, and may have a different color shade, as compared to the primary three-dimensional patterns. Accordingly, the secondary patterns external to the sponge particles may surround the primary three-dimensional patterns of the sponge particles, e.g., like a shadow. The shadow effect may form an appearance of one pattern, e.g., a chip, within another pattern, thereby generating an elegant and natural stone-like appearance.

An additive may be added to the sponge particles during formation, e.g., expansion-molding, thereof. The additive may be one or more of a lubricant, a plasticizer, a stabilizer, a reinforcing agent, a flame retardant, and/or any other suitable additive.

The sponge particles may be used in the composition for artificial stone as individual particles or as clusters of agglomerated particles, and a size, i.e., diameter, of the sponge particles may be adjusted to provide sufficient stability with respect to the MMA resin. Each sponge particle or cluster of particles may have an average pore diameter from about 0.01 mm to about 30 mm. If the sponge particle diameter is below about 0.01 mm, the particle may be too small to provide a proper porous web for the inorganic pigment and/or dye, thereby failing to form three-dimensional patterns. A diameter larger than about 30 mm may reduce composition smoothness and consistency, thereby triggering processing difficulties. In this respect, it should be noted that the diameter sizes of the sponge particles refer to diameters prior to incorporation into the composition for artificial stone. In other words, the sponge particles may swell due to fluid absorption, and therefore, the sponge particles in the final product may be larger than the sponge particles originally incorporated into the artificial stone composition.

An amount of the sponge particles in the artificial stone slurry may be adjusted with respect to the acrylic resin in order to impart proper pattern design and sufficient level of absorption. More specifically, the amount of sponge particles in the composition for artificial stone may be from about 0.001 ppwa to about 50 ppwa. An amount below about 0.001 ppwa may be insufficient to form visible, natural three-dimensional patterns, and an amount above about 50 ppwa may trigger processing difficulties.

The filler of the composition for artificial stone may be any suitable inorganic filler as determined by one of ordinary skill in the art. For example, the inorganic filler may include one or more of calcium carbonate, aluminum hydroxide, silica, alumina, barium sulfate, and/or magnesium hydroxide. The filler may have a particle size of about 1 μm to about 100 μm. For example, use of aluminum hydroxide may impart transparency properties and an elegant appearance to an article form of the composition for artificial stone. An amount of the inorganic filler in the composition for artificial stone may be about 100 ppwa to about 300 ppwa.

The polymerization initiator of the composition for artificial stone may include peroxides, e.g., benzoyl peroxide, lauroyl peroxide, butyl hydroperoxide, cumene hydroperoxide, and so forth, and azo compounds, e.g., azobisisobutylonitrile. An amount of the polymerization initiator in the composition for artificial stone may be in a range of from about 0.1 ppwa to about 10 ppwa.

The composition for artificial stone may further include artificial stone chips. The artificial stone chips may be of different colors, and may have particle diameters ranging from, e.g., about 0.1 mm to about 5 mm, in order to enhance patterns of the artificial stone article.

The composition for artificial stone according to embodiments of the present invention may be prepared as follows. For example, the acrylic resin, the pulverized sponge, the inorganic filler, and the polymerization initiator may be mixed at a temperature of about 120° C. to about 150° C. to form an artificial stone composition. The artificial stone composition may be poured into a molding cell of any suitable shape, e.g., a rectangular flat plate, and may be cured to solidify the artificial stone composition to form an artificial stone article.

EXAMPLES

Two artificial stone articles were formed according to embodiments of the present invention, i.e., Examples 1-2, and compared to a conventional artificial stone article, i.e., an artificial stone article including no sponge particles, in terms of appearance.

Example 1

Figure 2:
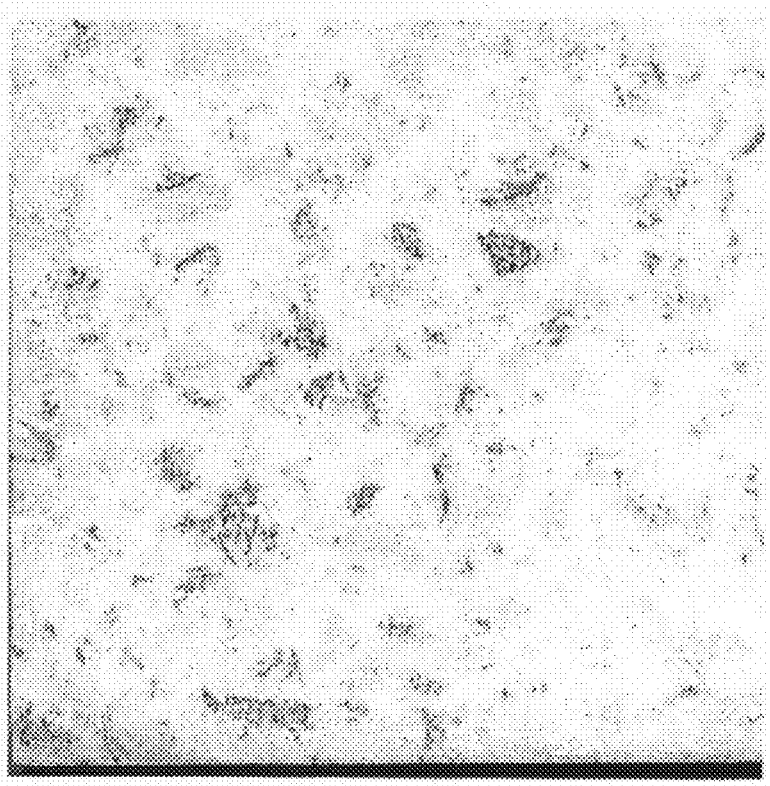
FIGS. 2-3 illustrate photographs of exemplary surface patterns of artificial stone articles according to an embodiment of the present invention.

A mixture of 30% by weight of MPPA and 70% by weight of MMA was prepared to form 100 parts of an acrylic resin. The 100 parts of the acrylic resin were mixed with 1 ppwa of pulverized polyamide sponge, 190 ppwa of aluminum hydroxide, and 2 ppwa of lauroyl peroxide to form an artificial stone slurry composition. The polyamide sponge (KUKJE Industrial Co., Ltd) was dyed in blue color, and the pulverized particles were passed through a 10-mesh sieve (1.9 mm). The artificial stone slurry composition was poured into a molding cell and cured at 120° C. to form a solid surface article in a form of a flat plate having a marble-looking appearance, as illustrated in FIG. 2.

Example 2

Figure 3:
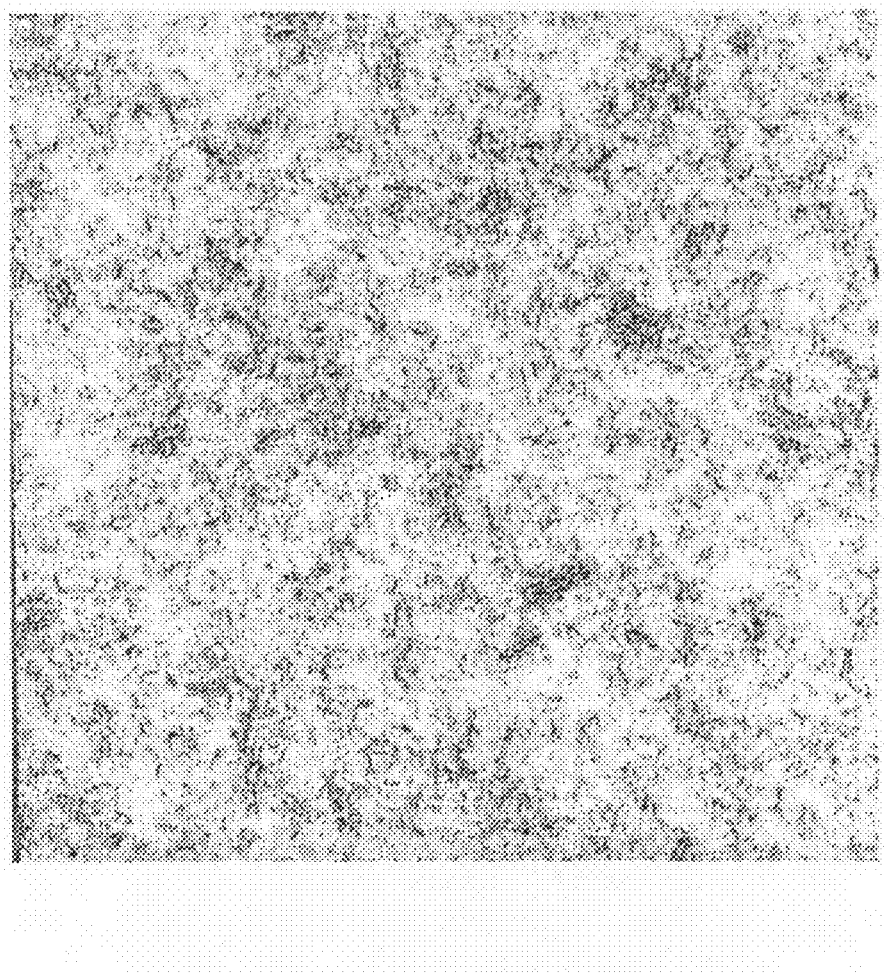

An artificial stone slurry composition was formed in a substantially same method described previously with respect to Example 1, with the exception of using 0.5 ppwa of blue pulverized polyamide sponge and 0.5 ppwa of green pulverized polyester, instead of using 1 ppwa of blue pulverized polyamide sponge. The polyamide and polyester sponge particles were available from KUKJE Industrial Co., Ltd, and were passed through a 10 mesh sieve (1.9 mm). The resultant solid surface article is illustrated in FIG. 3.

Comparative Example 1

An artificial stone slurry composition was formed in a substantially same method described previously with respect to Example 1, with the exception of including artificial stone chips having average particle diameters of 0.5 mm instead of sponge. The resultant solid surface article is illustrated in FIG. 1.

The composition for artificial stone according to embodiments of the present invention may be advantageous in having light weight and exhibiting unique, three-dimensional patterns having stone-like texture and appearance upon curing. More specifically, the composition for artificial stone according to embodiments of the present invention may include pulverized sponge with good color properties, i.e., including a dye or a pigment, dispersed therein, thereby forming a composition having a unique, natural stone appearance upon solidification. Since pulverized sponge may substantially or completely replace the conventional artificial stone chips, the composition for artificial stone according to embodiments of the present invention may have a substantially reduced weight, thereby having reduced processing time, i.e., eliminated chip-processing step, and manufacturing costs.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A composition for artificial stone, comprising:
   an acrylic resin;
   sponge particles in an amount of about 0.001 ppwa to about 50 ppwa;
   filler in an amount of about 100 ppwa to about 300 ppwa; and
   a polymerization initiator in an amount of about 0.1 to about 10 ppwa.

2. The composition as claimed in claim 1, wherein the acrylic resin includes a mixture of an acrylic monomer and a polyacrylate, the acrylic monomer being one or more of methacrylic acid, methyl methacrylate, ethyl methacrylate, isopropyl methacrylate, n-butyl methacrylate, and/or 2-ethylhexyl methacrylate.

3. The composition as claimed in claim 2, wherein the acrylic resin includes the acrylic monomer in an amount of about 65% or more by weight of a total weight of the acrylic resin.

4. The composition as claimed in claim 1, wherein the sponge particles include polyester particles and/or polyamide particles.

5. The composition as claimed in claim 1, wherein the sponge particles have a diameter of about 0.01 mm to about 30 mm.

6. The composition as claimed in claim 1, wherein the sponge particles include a colored dye and/or a colored pigment.

7. The composition as claimed in claim 1, wherein the sponge particles include an additive.

8. The composition as claimed in claim 7, wherein the additive is one or more of a lubricant, a plasticizer, a stabilizer, a reinforcing agent, and/or a flame retardant.

9. The composition as claimed in claim 1, wherein each sponge particle includes a porous web.

10. The composition as claimed in claim 1, wherein the filler includes one or more of calcium carbonate, aluminum hydroxide, silica, alumina, barium sulfate, and/or magnesium hydroxide.

11. The composition as claimed in claim 1, further comprising stone chips having a diameter of about 0.1 mm to about 5 mm.

12. An artificial stone article, comprising a solidified slurry composition, the slurry composition including an acrylic resin, sponge particles in an amount of about 0.001 ppwa to about 50 ppwa, filler in an amount of about 100 ppwa to about 300 ppwa, and a polymerization initiator in an amount of about 0.1 to about 10 ppwa.

13. The artificial stone article as claimed in claim 12, wherein the sponge particles include a porous web.

14. The artificial stone article as claimed in claim 13, wherein the sponge particles include a dye and/or a pigment in the porous web.

15. The artificial stone article as claimed in claim 14, wherein the solidified slurry composition includes a dye and/or a pigment around the sponge particles.

16. The artificial stone article as claimed in claim 12, wherein the solidified slurry composition exhibits random three-dimensional patterns having different shades of a same color.

17. A method of forming an artificial stone article, comprising:
mixing an acrylic resin, sponge particles in an amount of about 0.001 ppwa to about 50 ppwa, filler in an amount of about 100 ppwa to about 300 ppwa, and a polymerization initiator in an amount of about 0.1 to about 10 ppwa to form a slurry composition;
curing the slurry composition.

18. The method as claimed in claim 17, wherein forming the slurry composition includes heating the acrylic resin after adding the sponge particles.

19. The method as claimed in claim 17, wherein forming the slurry composition includes heating the acrylic resin and the sponge particles at a temperature of about 120° C. to about 150° C.

20. The method as claimed in claim 19, wherein a porous web in the sponge particles spreads out by an exothermic process.

* * * * *